Sept. 10, 1935.   R. E. BRESSLER   2,013,908
BEER DISPENSING APPARATUS
Filed Aug. 25, 1933
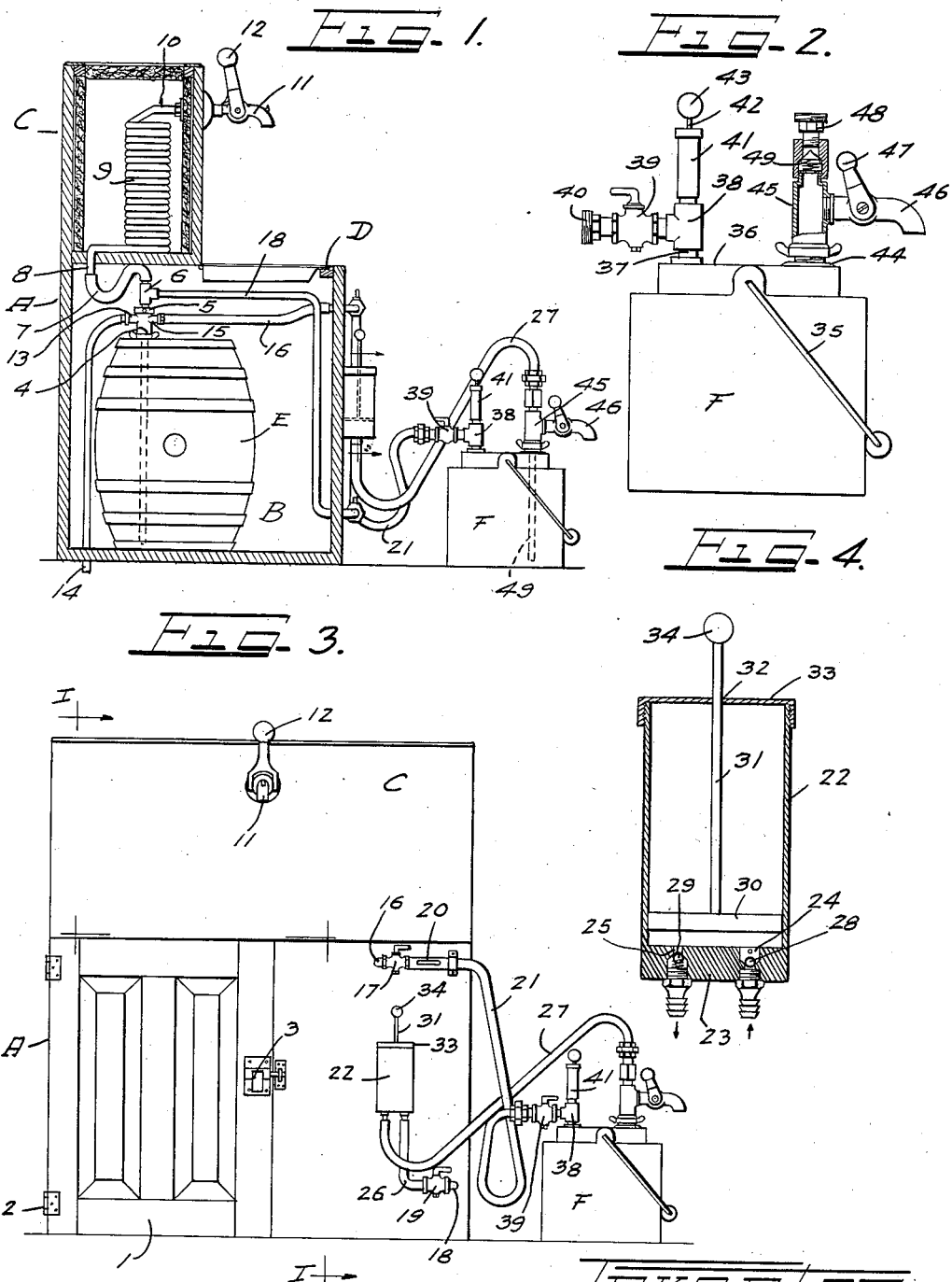

Patented Sept. 10, 1935

2,013,908

UNITED STATES PATENT OFFICE 2,013,908

BEER DISPENSING APPARATUS

Robert E. Bressler, Oregon, Ill.

Application August 25, 1933, Serial No. 686,705

2 Claims. (Cl. 225—16)

The present invention relates generally to a beer dispensing system, and more particularly to a system and means for filling small hand portable airtight containers of one, two or three gallons or like capacity, with beer from a barrel, whereby the customer may have draught beer for consumption in his home or elsewhere than the beer dispensary.

Many people prefer draught beer to bottled beer. Whenever one desires to consume draught beer elsewhere than at the beer dispensary, it is necessary to carry such beer to the place of use. If the beer is carried in open pails, or the like, it quickly becomes insipid and thus undesirable.

To enable the conveyance of draught beer from a beer dispensary to a place of use, the present invention has been made and is directed to means for accomplishing such purpose together with a system for the same.

Generally speaking, the present invention contemplates the provision of an airtight container of small capacity, say one, two or three gallons capacity, so that it may be conveniently and easily carried when filled.

A further contemplation of the present invention has to do with the dispensing of beer from such container whenever desired, and in such small quantities as may be required.

The invention further contemplates suitable means for filling such container from a beer barrel, without impairing the taste and quality of the beer.

An object of the present invention is to provide means for the attainment of the ends above recited.

Another object of the invention is to provide such means as may be readily applied to an existing draught beer dispensing means for carrying out the ends of the present invention.

A further object of the invention is to provide an airtight container of relatively small capacity, which container is readily and easily portable when filled, and which is provided with means for filling it with draught beer, sealing its contents to the atmosphere, and dispensing the contents of the container in small quantities as desired.

The accompanying drawing illustrates various aspects of embodiments of the present invention, and the views thereof are as follows:

Figure 1 is a vertical sectional view, taken substantially in the plane of line I—I of Figure 3, through a draught beer dispensary embodying principles of the present invention.

Figure 2 is an elevational view of a container made in accordance with the principles of the present invention, and showing certain details in section.

Figure 3 is a front view of a draught beer dispensary, showing attached thereto means for filling a portable container, and showing the portable container of the present invention connected for filling purposes from the barrel within the dispensary.

Figure 4 is an enlarged vertical sectional view through the hand pump forming part of the container filling means of the present invention.

The drawing will now be explained.

In the exemplification of the invention here chosen, a cabinet, designated generally at A is provided with a chamber B for the reception of a barrel of beer, or of several barrels, as desired, a cooling compartment C and a shelf D on which glasses, steins and the like may be placed for filling.

The front of the cabinet A is provided with a door 1 hinged at 2 to the cabinet structure and provided with a lock or latch 3.

Within the compartment B may be arranged a beer barrel E, or several barrels, which have connected through the tap bush thereof, a tap 4 having, in the present instance three ways. One way, 5, is connected to a T 6, to one end of which T 6 is joined a hose 7 which communicates with the lower end 8 of the cooling coil 9 within the cooling chamber C. The other end 10 of the coil engages a beer dispensing faucet 11, suitably attached to the front face of the cooling compartment C, and which is operable by a handle 12.

Another of the ways of the coupling 4, such as the way 13, is connected to an air outlet pipe 14. The third way 15 of the coupling 4 is connected to a conduit 16 which extends through the front face of the cabinet A where it joins a cock or check valve 17.

The T 6 is connected by means of a conduit 18 to a cock 19 arranged against the exterior of the front face of the cabinet A.

Communicating with the cock 17, is a sight glass 20 and communicating with the sight glass 20 is a conduit or hose 21.

Against the exterior of the front face of the cabinet A, is secured a hand pump 22 which has its bottom 23 provided with two passages 24 and 25. The passage 24, the inlet, is connected by means of a conduit 26 to the cock 19, and the passage 25 has connected to it a hose 27.

The passages 24 and 25 are provided with check valves consisting, in the present instance of balls 28 and 29 respectively. The check valve in the passage 24 is designed to admit beer to the interior of the pump 22 on upstroke of the piston 30 while the check valve in the passage 25 is adapted to close this passage on upstroke of the piston. On downstroke the check valve in the passage 25 opens and the pressure of the beer within the pump closes the check valve in the passage 24. The piston 30 is operable by a stem 31 extending through an aperture 32 in the top 33 of the pump. A suitable hand grip 34 is provided at the outer end of the stem 31.

The container F of the present invention contemplates one of small capacity, such as for instance one gallon, two gallon, three gallon, or other capacity, whereby the container may be easily and conveniently carried when filled with beer. The bail 35 is attached to the container for carrying it.

The container is airtight and has a cover 36 which may be sealed or otherwise so connected with the body of the container as to make an airtight connection. The container F is preferably a double walled container with the space between the walls evacuated or otherwise insulated. I can conveniently use the commercial "vacuum" jug or bottle for such container.

To provide filling means for the container F, a short pipe 37 is sealed in the top 36 of the container and to this pipe is connected one branch of a T 38. A valve 39 has connected to it one part of a union coupling 40. A pump 41 is connected to the third branch of the T 38, which pump is provided with a plunger 42 connected to a piston within the pump and at its outer end has a hand grip 43. The valve 39 in Figures 1 and 2 is shown in closed position, and in Figure 3 in opened position. The pump 41 may be detachable, in which event the T 38 is provided with some form of standard check valve to prevent outflow.

Secured to the cover 36 of the container F is a tap bush 44, of well known construction and to this bush is removably attached a tap or faucet structure 45. The tap has a discharge nozzle 46 controlled by a handle 47. The upper end of the tap or faucet structure 45 has connected to it one side of a union coupling 48. Within the structure is a check valve 49 so arranged as to normally close the outlet of the faucet structure to the atmosphere.

Whenever it is desired to fill the container F with beer, it is taken to a beer dispensary of the type herein described whereupon the conduit or hose 27 is connected to the tap or faucet structure 45 by engagement with the union member 48. The conduit or hose 21 is in like manner connected to the union coupling 40 of the inlet, whereupon the valve 39 is opened to establish communication with the interior of the container F.

The pump 22 is then actuated to pump beer from the barrel through the conduit 18, cock 19 which has been opened, through the pump then through the conduit 27 and into the container F through the tap or faucet structure 45. Then, as beer is delivered into the container F, in the manner described, the air within the container is forced outwardly through the T 38, valve 39, hose or conduit 21 and back to the interior of the barrel E, through the conduit 16. The attendant actuates the pump 22 until he observes, through the sight glass 29, the flow of beer from the container F back into the barrel E. This fact then indicates to the attendant that the container F is filled with beer whereupon he discontinues his pumping efforts, and closes the valves 19 and 29 whereupon the hoses or conduits 21 and 27 are disconnected from the container F. The check valve 49 in the tap or valve structure 45 prevents air escape from the container F while closing of the valve 39 prevents air escape at this point.

The customer thereupon grasps the bail 35 and carries the filled container F home or elsewhere, to such place where the beer will be consumed. As beer is drawn from the container F, it is discharged into glasses, steins or the like, by actuation of the handle 47 of the nozzle 46.

The provision of an airtight container, such as that herein described, maintains the quality and taste of the beer for a considerable length of time so that no deterioration of the beer results because of the fact that it is withdrawn from the barrel E and discharged into the container F.

The container F is of such size and shape as may be readily placed in an ice box or refrigerator for cooling the contents as desired.

The tap bush 44 is provided with a filling tube 49 which terminates adjacent the bottom of the container. This is for the purpose of preventing foaming of the beer as it is discharged into the container F from the barrel E, in the manner described.

Should pressure be required to cause the beer in container F to flow through the nozzle 46, the pump 41 may be actuated to create such pressure. It is, of course, understood that the conduit 18 may be connected adjacent the outlet of the coil 9 where it is desired to withdraw fluid at the temperature of that in said coil.

The invention has been described herein more or less precisely as to details, but it is to be understood that the invention is not limited thereby, as changes may be made in the arrangement and proportion of parts, and equivalents may be substituted, without departing from the spirit and scope of the invention.

The invention is claimed as follows:

1. A hand portable airtight beer container of small capacity; a connection on said container adapted to receive connections such as a hose for elimination of air in such container during filling; a valve in said connection; a dispensing faucet structure on said container, said faucet structure having means for receiving a conduit or hose to fill said container, said faucet structure having a check valve in it in the hose connection part of the faucet structure to normally close said structure against beer escape, and a hand operable pump in said first mentioned connection to create pressure within said container for beer discharged through said passage when the faucet is opened.

2. A portable air-tight container for beer and the like adapted to be readily carried by hand when filled, an air pump carried by and connected with said container and communicating with the interior thereof, a dispensing faucet carried by said container, said faucet having valve controlled means for connection with a filling tube to fill the container, said air pump connection having means for connection with an air discharge tube through which air is removed from said container as it is being filled, and a valve in said connection for closing the interior of the container to the atmosphere when said container is filled with beer or the like.

ROBERT E. BRESSLER.